Feb. 8, 1966    A. W. KELLY    3,234,291
SYNTHESIS OF PHENOLS
Filed July 6, 1962
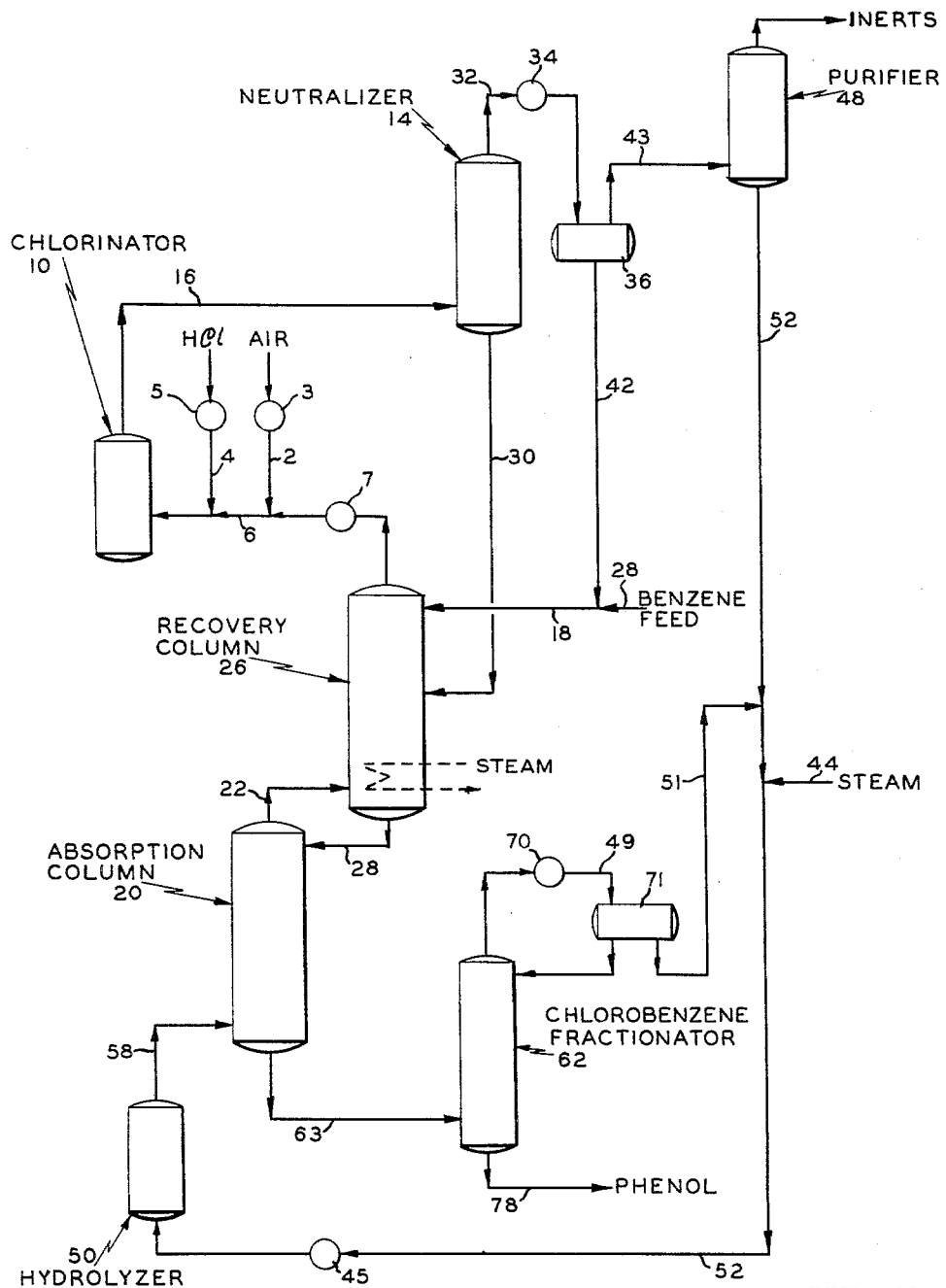
INVENTOR.
ARTHUR W. KELLY
BY G. H. Palmer
ATTORNEY
M. J. Maue
AGENT

United States Patent Office 3,234,291
Patented Feb. 8, 1966

3,234,291
SYNTHESIS OF PHENOLS
Arthur W. Kelly, Palisades, N.Y., assignor to Pullman Incorporated, a corporation of Delaware
Filed July 6, 1962, Ser. No. 207,939
10 Claims. (Cl. 260—629)

This invention relates to a process for the manufacture of phenols and more particularly to the production of a phenol from a monohalobenzene. In one aspect this invention relates to a method for treating the effluent from the hydrolysis of a monohalobenzene to produce a phenol.

This application is a continuation-in-part of application Serial No. 55,214 filed September 12, 1960.

One method of producing phenol which has found wide commercial application involves reacting benzene with a hydrogen halide, most usually hydrogen chloride, to produce the corresponding monohalobenzene and water and hydrolyzing the monohalobenzene to phenol at high temperatures in the vapor phase. The following equations describe the basic reactions of the process.

$$2C_6H_6 + 2HX + O_2 \rightarrow 2C_6H_5X + 2H_2O \quad (1)$$
$$C_6H_5X + H_2O \rightarrow C_6H_5OH + HX \quad (2)$$

wherein X is a halogen atom, preferably a chlorine or bromine atom. Several variations of the above reactions have been employed, namely, in place of the hydrogen halide, a halogen gas or another suitable halide capable of giving up a halogen atom in the reaction has been employed.

One of the main advantages in this process for making phenol is that by-products, generated either in the first or second reaction, can be usefully recycled in the process as reactant to the alternate reaction. However, because of the corrosive nature of the acidic hydrolysis by-product, e.g., the hydrogen halide, the operation of this process has been extremely expensive and has required specially designed apparatus, such as blowers, liquid extraction columns and piping, which are constructed of costly acid-resistant material. Thus, it has been the aim of phenol manufactureres to devise some method by which these difficulties are overcome and, more specifically, to devise a method of separating a treating hydrolysis effluent gases so that immediate recycle of useful by-product, or recycle of a non-corrosive by-product can be realized.

It is, therefore, an object of the present invention to provide a method which minimizes corrosion difficulties due to the hydrolysis effluent gases.

Another object of this invention is to provide a commercially feasible process for the production of a phenol wherein the gaseous effluent from the hydrolysis stage is separated into its components and acidic by-product of the hydrolysis reaction can be immediately recycled to the halogenation stage.

Another object of this invention is to provide a more complete separation of a phenol product from contaminants.

Still another object of this invention is to eliminate the corrosion difficulties associated with the production of a phenol by a commercially feasible and economic operation.

These and other objects of the present invention will become apparent to those skilled in the art from the following description and disclosure.

According to this process, the hot vaporous effluent from the vapor phase hydrolysis of a monohalobenzene containing the monohalobenzene, the phenol product, a hydrogen halide and water, is passed to an absorption or quenching zone wherein a portion of the monohalobenzene and substantially all of the phenol product are condensed and the hydrogen halide-water mixture is maintained above its dew point in the vapor phase together with the remaining portion of monohalobenzene which is not condensed with the phenol product. The vaporous mixture from the absorption zone is then passed to a recovery zone wherein a portion of the vaporous overhead from the absorption zone is condensed with the aid of a benzene reflux liquid. The benzene, hydrogen halide, water and some of the monohalobenzene are withdrawn from the upper portion of the zone as a vapor but the major portion of monohalobenzene is condensed, removed from the lower part of the recovery zone and employed as reflux to the absorption zone wherein a major portion of the reflux liquid is revaporized to prevent condensation of the hydrogen halide which is more volatile than the reflux liquid. The recovery zone is refluxed with a benzene derivative of the phenol product of the process and is preferably employed in the liquid state. The benzene reflux is obtained from any convenient source such as the benzene which is separated from the effluent of the halogenation reaction as the first stage of the process or fresh benzene may be supplied from an outside source when the hydrolysis is the sole reaction of the process. It is to be understood, however, that in the preferred two-stage halogenation-hydrolysis process, the benzene from the halogenation zone may be supplemented with fresh benzene feed from an extraneous source as the replacement of the benzene required in the halogenation zone of the process.

In the two-stage halogenation-hydrolysis process, a benzene is halogenated preferably with a hydrogen halide or a halogen gas to produce the corresponding monohalobenzene in a vaporous admixture with unreacted compounds. This vaporous effluent is passed to a neutralization and condensation zone wherein the vapors are neutralized and the monohalobenzene and higher boiling components are condensed, together with some benzene. The remaining portion of benzene is withdrawn as a vapor and treated for removal of whatever inert compounds which enter the system in the feed after which a concentrated benzene fraction is recovered. The liquid from the neutralization and condensation zone is treated as hereinafter described and then passed to a hydrolysis zone wherein the monohalobenzene is hydrolyzed with steam to produce a vaporous product mixture containing phenol, hydrogen halide and unreacted components.

The benzene compounds which may be suitably employed in the present invention include the carbocyclic compounds, preferably monocyclic compounds, such as benzene, toluene, xylene and other alkyl-substituted benzenes. The halogenating agents referred to herein include the hydrogen halides, e.g., hydrogen chloride, hydrogen bromide, hydrogen iodide and molecular halogen gases such as chlorine, bromine and iodine. The reaction of the benzene with the halogenating agent results in the production of the corresponding monohalobenzene wherein the halo portion of the compound is, for example, chlorine, bromine or iodine and the benzene is an unsubstituted carbocyclic ring or a substituted carbocyclic ring containing substituents from the alkyl series such as, for example, methyl, ethyl, propyl, etc. substituents. The monohalobenzene in the hydrolysis stage of the present process is converted to the corresponding phenol, for example, phenol, cresol, dimethyl phenol, methylethyl phenol, etc. The preferred process of the present invention involves the reaction of unsubstituted benzene with hydrogen chloride to produce monochlorobenzene and the hydrolysis of the monochlorobenzene to produce unsubstituted phenol as the product of the process.

As stated abope, the hydrolysis effluent is passed to an absorption zone wherein a mixture of the phenol product and monohalobenzene is separated as a liquid from the remaining hydrogen halide-water and monohalobenzene vapors. The vapors are then passed to a benzene refluxed recovery zone wherein most of the monohalobenzene is recovered as a liquid.

Fresh halobenzene feed or the liquid halobenzene mixed with benzene obtained from the neutralization zone is introduced to the recovery zone at a point below the reflux liquid in an amount such that ample reflux to effect complete condensation of the phenol in the absorption zone is insured. The absorption zone is operated under conditions such that a portion of the purified monohalobenzene which passes to the lower part of the zone is vaporized in order to maintain the hydrogen halide-water mixture at all times above its dew point. The recovery zone is operated under conditions such that at least a sufficient amount of monohalobenzene required for reflux to the absorption zone, preferably a major portion of the monohalobenzene in the recovery zone, is condensed while the hydrogen halide-water mixture and benzene is maintained at all times, in the vapor phase. When the monohalobenzene is chlorobenzene, and the hydrogen halide is hydrogen chloride, the temperature of the absorption zone is maintained above the dew point of the hydrogen chloride-water mixture, between about 200° F. and about 400° F. under from about 10 p.s.i.a. to about 315 p.s.i.a. and the recovery zone is maintained at a temperature of between about 150° F. and about 350° F. under from about 10 p.s.i.a. to about 315 p.s.i.a. Operations with other halides and halobenzenes can utilize conditions in excess or below these ranges in conformity with their boiling points. For example, when hydrogen bromide is reacted with benzene to produce monobromobenzene, and the monobromobenzene hydrolyzed to produce phenol and hydrogen bromide, the absorption and recovery zones can be operated at a temperature about 20° F. higher under similar pressures.

Basically, the process for producing phenol comprises hydrolyzing a monohalobenzene in the vapor phase with excess steam to produce a phenol product; although, the entire process, as practiced commercially, usually includes a preliminary halogenation step wherein a benzene is reacted with an inorganic halide or halogen gas in order to produce the monohalobenzene used in the hydrolysis step. This two-stage process is more completely described in copending applications Serial No. 55,214, filed September 12, 1960, and Serial No. 46,247, filed July 29, 1960 (now abandoned).

The present invention provides for an improvement in treating the hydrolysis effluent upon leaving the hydrolysis zone. Generally, hydrolysis is effected by feeding the monohalobenzene and steam to a hydrolysis zone wherein, under a pressure of between about 10 p.s.i.a. and about 300 p.s.i.a., the reaction takes place preferably in the presence of a catalyst. The resulting vaporous product mixture comprises phenol, hydrogen halide and unconverted reactants. The preferred hydrolysis catalyst is a neutral phosphate such as, for example, tricalcium phosphate, but other catalysts of high surface activity may also be employed or substituted, if desired. For example, catalysts which may be used include aluminum, silica gel, which may or may not be promoted with copper, nickel or cobalt or any other suitable promoting agent. Alternatively, catalysts mentioned in U.S. Patent 1,966,281 and U.S. Patent 1,961,834, and aluminum hydrosilicate may be employed, if desired. It is to be understood, however, that the hydrolysis reaction can be effected thermally in the absence of catalyst, with longer residence time, if desired.

The vaporous hydrolysis mixture leaving the hydrolysis zone at a temperature of between about 330° F. and about 1000° F., preferably between about 650° F. and about 900° F., is passed to a quenching or absorption zone which is refluxed with an additional quantity of the monohalobenzene employed either alone as a pure reflux liquid or in combination with an inert liquid hydrocarbon carrier as a liquid mixture suitable for reflux. If desired, the hydrolysis effluent can be cooled prior to entering the absorption zone.

The carrier is a liquid which is less volatile than benzene and more volatile than the monohalobenzene. For example, when the monohalobenzene is chlorobenzene, suitable carriers include heptanes, octanes, toluene, o-xylene, cycloheptane and cyclohexane. Of these carriers, n-heptane and toluene are preferred. Members of this group of carriers are also suitably employed in processes where the monohalobenzene is other than the chlorine derivative such as, for example, monobromobenzene, providing that their boiling points fall below the monohalobenzene employed. The carrier materials mentioned above, can be employed alone or in admixture as carriers for the monohalobenzene liquid reflux.

In the absorption zone, the reflux liquid passes to the lower portion of the zone wherein it serves to condense substantially all of the phenol and a minor portion of the monohalobenzene and leaves the lower portion of the zone. The major portion of monohalobenzene which is revaporized in the absorption zone is passed to the upper portion of the absorption tower from which it is removed as a vapor. When a carrier is employed, a major portion of the monohalobenzene can be removed from the absorption zone as a liquid and the revaporized portion of the reflux comprises mostly the hydrocarbon carrier. The absorption zone is maintained at all times above the dew point temperature of the hydrogen halide-water mixture so that at no time during this operation is any of the hydrogen halide condensed to cause problems as a corrosive mixture. The temperature is maintained in the absorption column by means of the quantity of the incoming reflux entering the upper portion of the tower, and by the temperature of the entering hydrolysis effluent vapors, but temperature control, e.g., in instances when the feed to the quenching zone is overcooled, can also be assisted by means of a controlled reboiler, if desired.

The vaporous material removed from the top of the absorption column, which contains monohalobenzene, hydrogen halide and water, together with the liquid hydrocarbon carrier, in cases where the carrier is employed in the reflux liquid, is then passed to a recovery zone wherein a major portion of the monohalobenzene or a major portion of the monohalobenzene and liquid hydrocarbon carrier, are condensed and the remaining portion of the monohalobenzene or monohalobenzene and carrier, together with benzene, hydrogen halide and water, are present in the vapors. In cases where undesirable reactions would occur with the carrier in the halogenation, e.g., the chlorination step, virtually all the carrier is condensed in the recovery column to prevent contamination of the halogenation zone.

In a two-stage halogenation-hydrolysis process, the halogenation effluent containing monohalobenzene, after the removal of at least a portion of the benzene, is passed to a lower portion of the feed recovery column in the rectification section of the column at a point intermediate to the introduction of vapors from the absorption column and reflux. Sufficient monohalobenzene, or monohalobenzene and carrier, is condensed to provide a reflux to the absorption zone which is sufficient to completely condense the phenol in the hydrolysis effluent mixture entering the absorption zone. Preferably the ratio of monohalobenzene to phenol in the absorption zone is between about 3:1 and about 100:1, most preferably between about 5:1 and about 50:1. Generally, proportions within this range are obtained by condensing substantially all of the monohalobenzene entering the recovery zone from the absorption zone, without carrier, and a major portion of the monohalobenzene entering rectification section of the recovery zone from the neutralization zone. The upper portion of the feed recovery zone or column is refluxed with a benzene obtained from the effluent of the preliminary halogenation step in a two-stage process or refluxed with fresh benzene from an extraneous source in a process wherein the hydrolysis represents the only stage of the process. It is to be understood, however, that fresh benzene feed can be used to supplement the benzene separated from the halogenation effluent as reflux and as feed to the halogenation reactor. Preferably, the ratio of benzene to monohalobenzene in the recovery zone is between about 0.5:1 and about 10:1. This reflux liquid is totally vaporized in the recovery column and is employed to maintain the desired temperature conditions therein. The monohalobenzene mixture from the halogenation zone also serves to control the temperature in the recovery column by providing an intermediate temperature control in the rectification section of such column. Also, for closer temperature control and more efficient operation, a reboiler is preferably employed in the lower portion of this zone. The condensed monohalobenzene, together with any liquid hydrocarbon carrier present in the recovery zone, is then withdrawn from the bottom of said zone and employed as reflux to the upper portion of the absorption column in such quantity as required to effect complete condensation of phenol therein. It is to be understood, however, that while in most instances it is desirable to employ the entire condensate from the recovery zone as reflux to the absorption zone, a portion of the condensate can be withdrawn from the system for direct recovery of monohalobenzene, if desired.

In a two-stage halogenation-hydrolysis process, the vapors removed from the upper portion of the recovery column are heated and returned to the halogenation reactor. In this recycle stream, additional quantities of hydrogen chloride and an oxygen-containing material, such as air, oxygen-enriched air, or molecular oxygen, can be introduced and employed to heat the vaporous recycle so as to main its vaporous condition and prevent corrosion problems due to condensation.

The liquid material removed from the lower portion of the absorption column is then fractionated to separate the monohalobenzene from the phenol and at least a portion of the monohalobenzene is recycled to the hydrolysis stage where, in the presence of steam, the continuous conversion to phenol is effected.

For a better understanding of the present invention, reference is now had to the accompanying drawing which represents a specific design for carrying out the production of phenol by chlorination of benzene and hydrolysis of the resulting monochlorobenzene while incorporating the process of the present invention. It is to be understood, of course, that additional apparatus, for example heat exchangers, reboilers, etc., may be employed in the operation shown as desired without departing from the scope of this invention.

In the drawing, air under a pressure of about 40 p.s.i.g., at a temperature of about 350° F., is passed in line 2 at a rate of about 6,800 pounds per hour through heater 3 wherein the temperature of the air is raised to about 450° F. The heated air is then passed through line 6 where it is mixed with a vaporous mixture containing benzene, hydrogen chloride and water at a temperature of about 450° F., which mixture has been heated from about 230° F. in heater 7. Additional hydrogen chloride is introduced into line 6 from line 4 after being heated in heater 5 above its dew point to provide a mixture containing about the stoichiometric amount required for the chlorination of the benzene in the mixture. The resulting mixture at a temperature of 450° F. is then passed to chlorination zone 10 which contains a catalytic mixture of iron and copper chlorides. In the chlorination zone, the vaporous benzene component undergoes about 2.4 mole percent conversion to monochlorobenzene in an exothermic reaction. The vaporous effluent from the chlorination zone, comprising a major portion of unconverted benzene, monochlorobenzene product and water, together with a trace amount of hydrogen chloride and a minor portion of polychlorobenzenes and inert gases which enter with the feed materials, is then introduced into neutralization zone 14 from conduit 16 wherein the material is neutralized by washing with a basic aqueous solution and is cooled to its organic dew point. About 96,600 pounds per hour of organic material is condensed in zone 14, which condensate comprises benzene, a major portion of the monochlorobenzene and polychlorobenzenes and which contains benzene in a weight ratio of about 13:1 with respect to monochlorobenzene.

The remaining portion of benzene, together with the inert gases and some monochlorobenzene is withdrawn from the neutralization zone through line 32 at a temperature of about 219° F. under about 25 p.s.i.g. and passed through cooler 34 for partial condensation of benzene. In separator 36, a benzene-monochlorobenzene mixture is separated in line 42 from the remaining gaseous mixture containing monochlorobenzene, benzene and inerts. The remaining vaporous mixture is passed by means of line 43 into purification zone 48 wherein the inert materials are vented from the system and the benzene, in admixture with a minor amount of monochlorobenzene, is recovered as a liquid and withdrawn in line 52.

About 66,000 pounds per hour of the liquid mixture in line 52, after the addition of chlorobenzene from line 51 and chlorobenzene fractionator 62, is admixed with steam introduced into the system by means of line 44. The resulting mixture which has been vaporized with steam in line 44 comprises about 69 percent monochlorobenzene, 28 percent water and about 3 percent benzene and is fed through conduit 52 at a rate of about 66,000 pounds per hour, is heated to a temperature of about 932° F. by means of heater 45, and is introduced into hydrolysis zone 50 where, in the presence of a granular phosphate catalyst, the conversion to phenol takes place in the vapor phase and hydrogen chloride by-product is reformed.

The resulting vaporous hydrolysis effluent is withdrawn from zone 50 by means of line 58 and passed to the lower portion of absorption column 20 at a temperature of about 930° F. The vaporous hydrolysis effluent contains 6 percent by weight of phenol, 3 percent by weight of benzene, 3 percent by weight of hydrogen chloride, 27 percent by weight of water, and 61 percent by weight of monochlorobenzene. Therefore, the total capacity of this operation is about 4,000 pounds per hour of phenol.

The absorption column is refluxed with about 100 weight percent of monchlorobenzene entering the top of the column at a temperature of about 290° F. to maintain the absorption zone at a temperature of about 330° F. in the bottom of the column and about 290° F. in the top of the column. As a result of the reflux liquid, fractionation takes place in zone 20 and results in the separation of a liquid stream containing substantially all of the phenol and at least the portion of the monochlorozenzene from hydrolysis. The liquid stream is withdrawn from the lower portion of zone 20 by means of line 63 and passed to chlorobenzene fractionator 62 wherein the monochlorobenzene is vaporized from the phenol product which is recovered as a product of the process by means of line 78. In another embodiment of recovery column operation, a reboiler may be used to vaporize some of the monochlorobenzene as a means of heat control in the column. In this case, reflux monohalobenzene in the absence of steam is recycled to the absorption at a higher temperature, e.g., 360° F. and a portion of this reflux is flashed upon contact with steam in zone 20.

The monochlorobenzene separated from zone 62 in line 49 is condensed in condenser 70, passed to holding drum 71 and a portion from drum 71 used as reflux to the zone. The remaining major portion of the condensed monochlorobenzene is then recycled by means of lines 51 and 52 to hydrolysis zone 50 after vaporization with steam and heating in heater 45 to a temperature of about 935° F.

The vaporous material withdrawn as overhead from the absorption column 20, comprising 1 weight percent hydrogen chloride, 9 weight percent water and 90 weight percent monochlorobenzene is then passed by means of line 22 into recovery column 26 at a temperature of 290° F. under 37 p.s.i.g. The top of column 26 is refluxed with 92,000 pounds per hour of benzene from line 18 at a temperature of about 212° F., which benzene is supplied by 87,500 pounds per hour of benzene from line 42 and 4,500 pounds per hour of fresh benzene feed from line 28. About 96,000 pounds per hour of the liquid organic mixture from the neutralization zone is removed from the bottom of zone 14 through line 30 at a temperature of about 220° F. and is passed to the rectification section of recovery column 26 after being heated to about 265° F. The temperature in the top of column 26 is maintained at about 230° F. by the incoming feeds thereto and by a controlled heat exchanger (not shown). In column 26, 184,000 pounds per hour of monochlorobenzene is condensed and employed as reflux to zone 20 by means of line 28. The remaining vapors in column 26 which comprise substantially all of the benzene, hydrogen chloride and water (1 weight percent hydrogen chloride, 9 weight percent water and 90 weight percent benzene) are withdrawn by means of line 6 and recycled to chlorination zone 10.

The operation of the absorption and recovery column serves to insure maintenance of the hydrogen chloride-water mixture at all times in the vapor state thus overcoming many of the costly corrosion problems heretofore encountered in the halogenation-hydrolysis operation for the production of phenol. It is to be understood, however, that many modifications and changes can be made in the design above-described without departing from the scope of this invention. For example, it may be desirable to cool the vaporous hydrolysis mixture in line 58 before entering the absorption column, in which case the temperature in the absorption column may be held constant with the aid of a reboiler. Also, the reflux liquid in line 28, which in the embodiment just described is substantially pure monochlorobenzene, can be partially recycled to the hydrolysis zone by withdrawing a portion of the liquid in line 28 for this purpose.

Many advantages over prior operation are obtained by employing the absorption-recovery zone separation of components. One of the main advantages realized by this two-zone operation is it makes possible the use of a reboiler on the bottoms of the recovery column 26, to insure proper temperature control so that the reboiler operates in a non-corrosive atmosphere. In this instance, the halogen acids flowing to the bottom of column 26 are stripped out in the zone, preferably a packed zone, above the reboiler.

As set forth above, a liquid reflux carrier, preferably selected from the group mentioned heretofore, e.g., n-heptane, can be employed along with the monochlorobenzene in line 28 for example, in a weight ratio of about 10:1 with respect to the ratio of carrier to monohalobenzene, by introducing a stream of such carried at any point between zones 20 and 26. By way of illustration, the carrier material can be introduced directly from an outside source into zone 20 and/or 26. However, if desired, the carrier material may be introduced into the system at any point in lines 58, 30 and/or 18. The amount of carrier material in the reflux liquid can vary from 0 percent to a major portion, preferably not in excess of 60 percent.

It is also to be understood that, in the above description a compound other than benzene, for example toluene, or xylene can be halogenated with an acidic halide or halogen gas other than hydrogen chloride, for example chlorine gas, bromine gas, hydrogen bromide, etc., to produce the corresponding monohalobenzene, which monohalobenzene can then be hydrolyzed to a phenol product corresponding to the benzene employed and a by-product acidic material corresponding to the halogenating agent used.

These, and other modifications of the above-described invention will become apparent to those skilled in the art, but are within the scope of the present invention.

Having thus described my invention I claim:

1. In a process for producing a phenol wherein a monohalobenzene is hydrolyzed with steam in the vapor phase to produce a vaporous effluent containing the phenol, a hydrogen halide and water, the improvement which comprises: passing the vaporous hydrolysis effluent to an absorption zone; refluxing the absorption zone with monohalobenzene; maintaining the temperature in the absorption zone above the dew point of the water-hydrogen halide mixture and below the condensation temperature of the phenol; condensing substantially all of the phenol and a portion of the monohalobenzene in the absorption zone; passing the vaporous mixture of hydrogen halide-water and monohalobenzene to a recovery zone maintained above the dew point of the water-hydrogen halide mixture and below the condensation temperature of the monohalobenzene; refluxing the recovery zone with a benzene having the same number of carbon atoms as the monohalobenzene; condensing a major portion of the monohalobenzene in the recovery zone and using said condensate to reflux said absorption zone.

2. In a process for producing a phenol wherein a monohalobenzene is hydrolyzed with steam in the vapor phase to produce a vaporous effluent containing the phenol, a hydrogen halide and water, the improvement which comprises: passing the vaporous hydrolysis effluent to an absorption zone; refluxing the absorption zone with a liquid mixture of monohalobenzene and a liquid hydrocarbon carrier having a boiling point below the boling point of the monohalobenzene; maintaining the temperature in the absorption zone above the dew point of the hydrogen halide-water mixture and below the condensation temperature of the phenol; condensing substantially all of the phenol and a portion of the monohalobenzene in the absorption zone; passing the remaining vaporous mixture of the hydrogen halide-water, hydrocarbon carrier and monohalobenzene to a recovery zone maintained above the dew point of the water-hydrogen halide mixture and below the condensation temperature of the monohalobenzene and hydrocarbon carrier; refluxing the recovery zone with a benzene having the same number of carbon atoms as the monohalobenzene; condensing a major portion of the monohalobenzene and hydrocarbon carrier in the recovery zone and using said condensate to reflux said absorption zone.

3. The process of claim 2 wherein the hydrocarbon carrier is n-heptane.

4. The process of claim 2 wherein the hydrocarbon carrier is toluene.

5. The process of claim 2 wherein the hydrocarbon carrier is an octane.

6. In a process for producing a phenol wherein a benzene is reacted with a halogenating agent in a halogenation zone to produce the corresponding monohalobenzene, the monohalobenzene is hydrolyzed with steam to produce a vaporous effluent comprising a phenol, water and hydrogen halide, and recovering the phenol from the vaporous effluent, the improvement which comprises: passing the vaporous hydrolysis effluent into an absorption zone; refluxing the absorption zone with an additional portion of the monohalobenzene; maintaining the temperature in said absorption zone above the dew point of the water-hydrogen halide mixture and below the condensation temperature of the phenol; condensing substantially all of the phenol and a minor portion of the monohalobenzene in the absorption zone; recovering the phenol as a product of the process passing the remaining vapors from the absorption zone to a recovery zone wherein the temperature is maintained above the dew point of the water-hydrogen halide mixture and below the condensation temperature of the monohalobenzene; refluxing the recovery zone with a benzene having the same number of carbon atoms as the monohalobenzene; passing a mixture of an additional quantity of said benzene used for reflux and monohalobenzene to a lower portion of said recovery zone to effect rectification in said zone; condensing a major portion of the monohalobenzene in the recovery zone; employing the condensed monohalobenzene as reflux to the absorption zone; withdrawing a vaporous mixture of hydrogen halide-water and benzene from the recovery zone and recycling said vaporous mixture to the halogenation zone under conditions employed therein.

7. The process of claim 6 wherein the benzene is unsubstituted benzene, the halogenating agent is hydrogen chloride, the monohalobenzene is monochlorobenzene and the phenol is unsubstituted phenol.

8. The process of claim 6 wherein the benzene is unsubstituted benzene, the halogenating agent is hydrogen bromide, the monohalobenzene is monobromobenzene and the phenol is unsubstituted phenol.

9. In a process for producing phenol wherein monochlorobenzene is hydrolyzed with steam in the vapor phase to produce a vaporous effluent containing phenol, hydrogen chloride and water, the improvement which comprises: passing the vaporous hydrolysis effluent to an absorption zone; refluxing the absorption zone with monochlorobenzene; maintaining the temperature in the absorption zone above the dew point of the water-hydrogen chloride mixture and below the condensation temperature of phenol; condensing substantially all of the phenol and a portion of the monochlorobenzene in the absorption zone; passing the vaporous mixture of hydrogen chloride-water and a major portion of the monochlorobenzene to a recovery zone maintained above the dew point of the water-hydrogen chloride mixture and below the condensation temperature of the monochlorobenzene; refluxing the recovery zone with benzene; condensing at least a major portion of the monochlorobenzene in the recovery zone and using said condensate to reflux said absorption zone.

10. In a process for producing phenol wherein monochlorobenzene is hydrolyzed with steam in the vapor phase to produce a vaporous effluent containing phenol, hydrogen chloride and water, the improvement which comprises: passing the vaporous hydrolysis effluent to an absorption zone; refluxing the absorption zone with monochlorobenzene; maintaining the temperature in the absorption zone above the dew point of the water-hydrogen chloride mixture and below the condensation temperature of phenol; condensing substantially all of the phenol and a portion of the monochlorobenzene in the absorption zone; passing the vaporous mixture of hydrogen chloride-water and a major portion of the monochlorobenzene to a recovery zone maintained above the dew point of the water-hydrogen chloride mixture and below the condensation temperature of the monochlorobenzene; reboiling the recovery zone with steam in the absence of hydrogen chloride which is maintained in the vapor phase to provide a non-corrosive atmosphere for the reboiler; refluxing the recovery zone with benzene; condensing at least a major portion of the monochlorobenzene in the recovery zone and using said condensate to reflux said absorption zone.

References Cited by the Examiner
UNITED STATES PATENTS 2,988,573   6/1961   Siebentritt et al. _____ 260—629

FOREIGN PATENTS 718,454   3/1942   Germany.

LEON ZITVER, *Primary Examiner.*

HAROLD G. MOORE, *Examiner.*